United States Patent
Kimura et al.

(10) Patent No.: US 6,535,614 B1
(45) Date of Patent: Mar. 18, 2003

(54) METHOD AND APPARATUS FOR RECORDING AND REPRODUCING ELECTRONIC WATERMARK INFORMATION, AND RECORDING MEDIUM

(75) Inventors: Hiroyuki Kimura, Hiratsuka (JP); Takao Arai, Yokohama (JP); Toshifumi Takeuchi, Ota-ku (JP); Hiroshi Yoshiura, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/139,112

(22) Filed: Aug. 24, 1998

(30) Foreign Application Priority Data

Sep. 3, 1997 (JP) .............................. 9-238029

(51) Int. Cl.⁷ .................................... G06K 9/00
(52) U.S. Cl. ..................................... 382/100; 380/204
(58) Field of Search .................... 382/10, 232, 236, 382/306; 348/473; 375/240.08, 150; 380/54, 201, 204

(56) References Cited

U.S. PATENT DOCUMENTS

| | | | |
|---|---|---|---|
| 3,569,619 A | 3/1971 | Simjian | 235/380 |
| 4,230,990 A | 10/1980 | Lert, Jr. et al. | 725/22 |
| 4,238,849 A | 12/1980 | Gassmann | 348/467 |
| 4,367,488 A | 1/1983 | Leventer et al. | 370/204 |
| 4,380,027 A | 4/1983 | Leventer et al. | 348/467 |
| 4,425,642 A | 1/1984 | Moses et al. | 370/477 |
| 4,739,377 A | 4/1988 | Allen | 355/133 |
| 4,750,173 A | 6/1988 | Bluthgen | 370/528 |
| 4,807,031 A | 2/1989 | Broughton et al. | 348/460 |
| 4,879,747 A | 11/1989 | Leighton et al. | 713/186 |
| 4,888,798 A | 12/1989 | Earnest | 705/54 |
| 4,908,873 A | 3/1990 | Philibert et al. | 382/100 |
| 4,944,036 A | 7/1990 | Hyatt | 367/43 |
| 4,947,028 A | 8/1990 | Gorog | 235/380 |
| 4,972,476 A | 11/1990 | Nathans | 713/186 |
| 4,977,594 A | 12/1990 | Shear | 705/53 |
| 5,023,907 A | 6/1991 | Johnson | 710/200 |
| 5,027,401 A | 6/1991 | Soltesz | 380/54 |
| 5,053,956 A | 10/1991 | Donald | 713/601 |
| 5,095,196 A | 3/1992 | Miyata | 235/382 |
| 5,103,459 A | 4/1992 | Gilhousen et al. | 370/206 |
| 5,113,445 A | 5/1992 | Wang | 380/51 |
| 5,146,457 A | 9/1992 | Veldhuis et al. | 370/523 |
| 5,181,786 A | 1/1993 | Hujink | 400/61 |
| 5,200,822 A | 4/1993 | Bronfin et al. | 725/22 |
| 5,213,337 A | 5/1993 | Sherman | 463/40 |
| 5,259,025 A | 11/1993 | Monroe | 705/75 |

(List continued on next page.)

FOREIGN PATENT DOCUMENTS

| | | |
|---|---|---|
| CA | 2235002 | 12/1998 |
| EP | 0 441 702 A1 | 8/1991 |
| EP | 441702 | 8/1991 |

(List continued on next page.)

OTHER PUBLICATIONS

U.S. patent application Ser. No. 60/000442, Hudetz, filed Jun. 20, 1995.
U.S. patent application Ser. No. 60/082228, Rhoads, filed Apr. 16, 1998.
U.S. patent application Ser. No. 60/141763, Davis, filed Jun. 30, 1999.

(List continued on next page.)

Primary Examiner—Jayanti K. Patel
(74) Attorney, Agent, or Firm—Antonelli, Terry, Stout & Kraus, LLP (57) ABSTRACT

At recording of a video signal, with electronic watermark information being embedded therein, on a recording medium, a reference signal which is formed differently from the watermark information is inserted to the video signal. At reproduction of the video signal, the luminance of the watermark information is modified based on the reference signal.

2 Claims, 10 Drawing Sheets

U.S. PATENT DOCUMENTS

| | | | |
|---|---|---|---|
| 5,280,537 A | 1/1994 | Sugiyama et al. | 370/529 |
| 5,288,976 A | 2/1994 | Citron | 235/375 |
| 5,295,203 A | 3/1994 | Krause et al. | 382/248 |
| 5,315,098 A | 5/1994 | Tow | 235/494 |
| 5,374,976 A | 12/1994 | Spannenburg | 399/366 |
| 5,379,345 A | 1/1995 | Greenberg | 455/2.01 |
| 5,416,307 A | 5/1995 | Danek et al. | 235/449 |
| 5,428,607 A | 6/1995 | Hiller et al. | 370/352 |
| 5,428,731 A | 6/1995 | Powers | 707/501.1 |
| 5,463,209 A | 10/1995 | Figh | 235/383 |
| 5,469,222 A | 11/1995 | Sprague | 348/580 |
| 5,469,506 A | 11/1995 | Berson et al. | 713/186 |
| 5,493,677 A | 2/1996 | Bfalogh | 707/104.1 |
| 5,495,581 A | 2/1996 | Tsai | 707/526 |
| 5,496,071 A | 3/1996 | Walsh | 283/70 |
| 5,502,576 A | 3/1996 | Ramsay et al. | 358/444 |
| 5,521,722 A | 5/1996 | Colvill et al. | 358/500 |
| 5,530,759 A | 6/1996 | Braudaway et al. | 380/54 |
| 5,530,852 A | 6/1996 | Meske, Jr. et al. | 709/206 |
| 5,568,550 A | 10/1996 | Ur | 382/306 |
| 5,594,226 A | 1/1997 | Steger | 235/379 |
| 5,598,526 A | 1/1997 | Daniel et al. | 345/540 |
| 5,613,004 A | 3/1997 | Cooperman et al. | 380/28 |
| 5,617,119 A | 4/1997 | Briggs et al. | 707/100 |
| 5,636,292 A * | 6/1997 | Rhoads | 382/232 |
| 5,638,443 A | 6/1997 | Stefik | 705/54 |
| 5,640,193 A | 6/1997 | Wellner | 725/100 |
| 5,646,999 A | 7/1997 | Saito | 705/54 |
| 5,652,626 A | 7/1997 | Kawakami et al. | 348/463 |
| 5,659,164 A | 8/1997 | Schmid | 235/375 |
| 5,664,018 A | 9/1997 | Leighton | 380/54 |
| 5,665,951 A | 9/1997 | Newman et al. | 235/375 |
| 5,668,636 A | 9/1997 | Beach et al. | 358/296 |
| 5,671,282 A | 9/1997 | Wolff et al. | 713/179 |
| 5,673,316 A | 9/1997 | Auerbach et al. | 705/51 |
| 5,687,236 A | 11/1997 | Moskowitz et al. | 380/28 |
| 5,710,636 A | 1/1998 | Curry | 358/3.28 |
| 5,719,939 A | 2/1998 | Tel | 713/179 |
| 5,721,788 A | 2/1998 | Powell et al. | 382/100 |
| 5,727,092 A | 3/1998 | Sandford, II et al. | 382/251 |
| 5,735,547 A | 4/1998 | Morelle et al. | 283/67 |
| 5,740,244 A | 4/1998 | Indeck et al. | 713/176 |
| 5,742,845 A | 4/1998 | Wagner | 395/821 |
| 5,745,604 A | 4/1998 | Rhoads | 382/232 |
| 5,761,686 A | 6/1998 | Bloomberg | 707/529 |
| 5,768,426 A | 6/1998 | Rhoads | 382/232 |
| 5,778,102 A | 7/1998 | Sandford, II et al. | 382/251 |
| 5,790,693 A | 8/1998 | Graves et al. | 382/135 |
| 5,790,697 A | 8/1998 | Munro et al. | 382/135 |
| 5,804,803 A | 9/1998 | Cragun et al. | 235/375 |
| 5,809,317 A | 9/1998 | Kogan et al. | 707/501.1 |
| 5,817,205 A | 10/1998 | Kaule | 382/294 |
| 5,818,441 A | 10/1998 | Throckmorton et al. | 345/717 |
| 5,819,289 A | 10/1998 | Sanford, II et al. | 707/104.1 |
| 5,825,871 A | 10/1998 | Mark | 379/357.03 |
| 5,825,892 A | 10/1998 | Braudaway et al. | 380/51 |
| 5,838,458 A | 11/1998 | Tsai | 358/402 |
| 5,841,978 A | 11/1998 | Rhoads | 709/217 |
| 5,848,144 A | 12/1998 | Ahrens | 379/219 |
| 5,848,155 A * | 12/1998 | Cox | 380/4 |
| 5,848,413 A | 12/1998 | Wolff | 707/10 |
| 5,852,673 A | 12/1998 | Young | 382/164 |
| 5,857,038 A | 1/1999 | Owada et al. | 382/284 |
| 5,862,218 A | 1/1999 | Steinberg | 713/176 |
| 5,862,260 A | 1/1999 | Rhoads | 382/232 |
| 5,869,819 A | 2/1999 | Knowles et al. | 235/375 |
| 5,871,615 A | 2/1999 | Harris | 162/140 |
| 5,872,589 A | 2/1999 | Morales | 725/24 |
| 5,875,249 A | 2/1999 | Mintzer et al. | 380/54 |
| 5,893,101 A | 4/1999 | Balogh et al. | 707/100 |
| 5,898,779 A | 4/1999 | Squilla et al. | 713/176 |
| 5,900,608 A | 5/1999 | Iida | 235/381 |
| 5,902,353 A | 5/1999 | Reber et al. | 709/219 |
| 5,903,729 A | 5/1999 | Reber et al. | 709/219 |
| 5,905,248 A | 5/1999 | Russell et al. | 235/462.15 |
| 5,905,251 A | 5/1999 | Knowles | 235/472.01 |
| 5,905,810 A | 5/1999 | Jones et al. | 382/135 |
| 5,913,210 A | 6/1999 | Call | 707/4 |
| 5,915,027 A | 6/1999 | Cox et al. | 380/54 |
| 5,930,767 A | 7/1999 | Reber et al. | 705/26 |
| 5,932,863 A | 8/1999 | Rathus et al. | 235/462.15 |
| 5,933,798 A * | 8/1999 | Linnartz | 702/191 |
| 5,933,829 A | 8/1999 | Durst et al. | 707/10 |
| 5,938,726 A | 8/1999 | Reber et al. | 709/217 |
| 5,938,727 A | 8/1999 | Ikeda | 709/218 |
| 5,939,695 A | 8/1999 | Nelson | 235/383 |
| 5,940,595 A | 8/1999 | Reber et al. | 709/227 |
| 5,949,055 A | 9/1999 | Fleet et al. | 235/469 |
| 5,950,173 A | 9/1999 | Perkowski | 705/26 |
| 5,963,916 A | 10/1999 | Kaplan | 705/26 |
| 5,971,277 A | 10/1999 | Cragun et al. | 235/462.01 |
| 5,974,141 A | 10/1999 | Saito | 705/52 |
| 5,974,548 A | 10/1999 | Adams | 713/200 |
| 5,978,773 A | 11/1999 | Hudetz et al. | 705/23 |
| 5,979,757 A | 11/1999 | Tracy et al. | 235/383 |
| 5,983,218 A | 11/1999 | Syeda-Mahmoo | 707/3 |
| 5,991,426 A | 11/1999 | Cox et al. | 382/100 |
| 6,005,501 A | 12/1999 | Wolosewicz | 341/52 |
| 6,035,177 A | 3/2000 | Moses et al. | 725/22 |
| 6,052,486 A | 4/2000 | Knowlton et al. | 382/232 |
| 6,064,764 A | 5/2000 | Bhaskaran et al. | 382/183 |
| 6,069,914 A * | 5/2000 | Cox | 375/150 |
| 6,122,403 A * | 9/2000 | Rhoads | 382/233 |
| 6,324,574 B1 | 9/2000 | Rhoads | 709/218 |
| 6,166,750 A | 12/2000 | Negishi | 347/131 |
| 6,181,802 B1 * | 1/2001 | Todd | 382/100 |
| 6,226,387 B1 * | 5/2001 | Tewfik et al. | 382/100 |
| 6,266,430 B1 | 7/2001 | Rhoads et al. | 382/100 |
| 6,311,214 B1 | 10/2001 | Rhoads | 709/277 |

FOREIGN PATENT DOCUMENTS

| | | | |
|---|---|---|---|
| EP | 493 091 | 7/1992 | |
| EP | 0789480 | 8/1997 | |
| EP | 872995 | 10/1998 | |
| WO | WO94/27228 | 11/1994 | |
| WO | WO95/04665 | 2/1995 | |
| WO | WO95/10813 | 4/1995 | |
| WO | WO98/14887 | 4/1998 | |
| WO | WO98/20642 | 5/1998 | |
| WO | WO98/24050 | 6/1998 | |
| WO | WO98/40823 | 9/1998 | |
| WO | WO98/49813 | 11/1998 | |
| WO | WO99/34277 | 7/1999 | |
| WO | WO99/36876 | 7/1999 | 382/100 |
| WO | WO00/44131 | 7/2000 | |
| WO | WO 01/80169 | 10/2001 | 382/100 |

OTHER PUBLICATIONS

U.S. patent application Ser. No. 60/158015, Davis et al., filed Oct. 6, 1999.

Brassil et al., Electronic Marking and Identification Techniques to Discourage Document Copying, Proceedings of INFOCOM '94 Conference on Computer, IEEE Commun. Soc Conference, Jun. 12–16, 1994, 1278–1287.

Bruckstein, A.M.; Richardson, T.J., A holographic transform domain image watermarking method, Circuits, Systems, and Signal Processing vol. 17, No. 3 p. 361–89, 1998. This paper includes an appendix containing an internal memo of Bell Labs, which according to the authors of the paper, was dated Sep. 1994.

"High Water FBI Limited Presentation Image Copyright Protection Software," FBI Ltd brochure, Jul., 1995, 17 pages.

Koch et al., "Copyright Protection for Multimedia Data," Fraunhofer Institute for Computer Graphics, Dec. 16, 1994, 15 pages.

Koch et al., "Towards Robust and Hidden Image Copyright Labeling," Proc. of 1995 IEEE Workshop on Nonlinear Signal and Image Processing, Jun. 20–22, 1995, 4 pages.

Kurak et al., "A Cautionary Note On Image Downgrading," 1992 IEEE, pp. 153–159.

Mintzer et al., "Safeguarding Digital library Contents and Users" Digital Watermarking, D–Lib Magazine, Dec. 1997: ISSN 1082–9873.

Rindfrey, "Towards an Equitable System for Access Control and Copyright Protection in Broadcast Image Services: The Equicrypt Approach," Intellectual Property Rights and New Technologies, Proc. of the Conference, R. Oldenbourg Verlag Wien Munchen 1995, 12 pages.

Schreiber et al., "A Compatible High–Definition Television System Using the Noise–Margin Method of Hiding Enhancement Information," SMPTE Journal, Dec. 1989, pp. 873–879.

SDMI Example Use Scenarios (Non–Exhaustive), Version 1.2, Jun. 16, 1999.

Szepanski, "A Signal Theoretic Method for Creating Forgery–Proof Documents for Automatic Verification," Proceedings 1979 Camahan Conference on Crime Countermeasures, May 16, 1979, pp. 101–109.

Szepanski, "Additive Binary Data Transmission for Video Signals," Papers Presented at Conf. Of Comm. Engineering Soc. Sep. 30–Oct. 3, 1980, Technical Reports vol. 74, pp. 342–352.

Tanaka et al., "A Visual Retrieval System with Private Information for Image Database," Proceeding International Conference on DSP Applications and Technology, Oct. 1991, pp. 415–421.

Tanaka et al., "New Integrated Coding Schemes for Computer–Aided Facsimile," Proc. IEEE Int'l Conf. on Sys. Integration, Apr. 1990, pp. 275–281.

Tirkel et al, "Electronic Water Mark," DICTA–93, Macquarie University, Sydney Australia, Dec., 1993, pp. 666–673.

Weber et al., "Correlative Image Registration," Seminars in Nuclear Medicine, vol. XXIV, No. 4, Oct., 1994, pp. 311–323.

*Audio Watermarking Architectures for Secure Digital Music Distribution, A Proposal to the SDMI Portable Devices Working Group* by ARIS Technologies, Inc, Mar. 26, 1999, pp. 1–11.

*Audio Watermarking Architectures for Persistent Protection, Presentation to SDMI PDWG,* Mar. 29, 1999, J. Winograd, Aris Technologies, pp 1–16.

*Audio Watermarking System to Screen Digital Audio Content for LCM Acceptance, A Proposal Submitted in Response to PDWG99050504–Transition CfP* by ARIS Technologies, Inc., May 23, 1999, Document Version 1.0, 15 pages.

Boland et al., "Watermarking Digital Images for Copyright Protection", *Fifth Int'l Conference on Image Processing and it's Application,* Jul. 1995, pp. 326–330.

Levy, "AIPL's Proposal for SDMI: An Underlying Security System" (slide presentation), Mar. 29, 1999, 23 slides..

*Microsoft Response to CfP for Technology Solutions to Screen Digital Audio Content for LCM Acceptance,* SDMI, PDWG Tokyo, May 23, 1999, 9 pages.

*Response to CfP for Technology Solutions to Screen Digital Audio Content for LCM Acceptance,* NTT Waveless Radio Consotium, May 23, 1999, 9 pages.

Sandford II et al., "The Data Embedding Method", *Proceedings of the SPIE* vol. 2615, pp. 226–259, 1996.

Thomas, Keith, *Screening Technology for Content from Compact Discs,* May 24, 1999, 11 pages.

Tirkel et al., "Electronic Water Mark," *Dicta–93,* Marquarie University, Sydney, Australia, Dec., 1993, pp. 666–672.

Vidal et al., "Non–Noticeable Information Embedding in Color Images: Marking and Detection", *IEEE* 1999, pp. 293–297.

Wolfgang et al., "A Watermark for Digital Images," *Computer Vision and Image Processing Laboratory, Purdue University,* Sep. 1996, pp. 219–222.

Szepanski, "A Signal Theoretic Method for Creating Forgery–Proof Documents for Automatic Verification," Proceedings 1979 Carnahan Conference on Crime Countermeasures, May 16, 1979, pp. 101–109.

Dautzenberg, "Watermarking Imges," Department of Microelectronics and Electrical Engineering, Trinity College Dublin, 47 pages, Oct. 1994.

Szepanski, "Additive Binary Data Transmission for Video Signals," Conference of the Communications Engineering Society, 1980, NTG Technical Reports, vol. 74, pp. 343–351. (German text and English translation enclosed).

U.S. patent appliction Ser. No. 60/071,983, Levy, filed Jan. 20, 1998.

U.S. patent application Ser. No. 09/404,291, Levy, filed Sep. 23, 1999.

U.S. patent application Ser. No. 60/114,725, Levy, filed Dec. 31, 1998.

U.S. patent application Ser. No. 09/234,780, Rhoads et al., filed Jan. 20, 1999.

U.S. patent application Ser. No. 60/116,641, Cookson, filed Jan. 21, 1999.

U.S. patent application Ser. No. 09/478,713, Cookson, filed Jan. 6, 2000.

Cookson, Chris, General Principles of Music Uses on Portable Devices, presented to SDMI, Mar. 5, 1999.

Winograd, J.M., "Audio Watermarking Architecture for Secure Digital Music Distribution," a Proposal to the SDMI Portable Devices Working Group, by Aris Technologies, Inc., Mar. 26, 1999.

Mintzer et al., "Safeguarding Digital Library Contents and Users: Digital Watermarking," D–Lib Magazine, Dec. 1997, 12 pages.

\* cited by examiner

FIG. 17

METHOD AND APPARATUS FOR RECORDING AND REPRODUCING ELECTRONIC WATERMARK INFORMATION, AND RECORDING MEDIUM

CROSS-REFERENCE TO RELATED APPLICATIONS

This application is related to application Ser. No. 09/984,029 filed on Oct. 26, 2001, and application Ser. No. 10/150,939 filed on May 21, 2002, both of which are continuations of the present application.

BACKGROUND OF THE INVENTION

1. Field of the Invention

The present invention relates to a method and apparatus for recording and reproducing image data, particularly electronic watermark information embedded (hidden) in video signals, which is used for the picture recording and reproduction control or for marking the origins of the records, and also relates to a recording medium on which electronic watermark information is recorded by being embedded in a video signal.

2. Description of the Prior Art

Among the several schemes proposed for embedding electronic watermark information in video signals, representative one is described in the article entitled "Data Hiding Technique" in publication ITE Technical Report, Vol.21, No.31, pp.3–8. Another conventional information embedding technique is described in publication Nikkei Electronics, No.683, pp.99–107, published in 1997. These conventional techniques are intended to embed, in a video signal, information that is different in terms of statistical characteristics of image from the inherent picture information carried by the video signal, and use the embedded information at the time of picture reproduction for identifying the origin of the record or producing a control signal which enables or disable the reproducing of the video signal.

However, these publications mainly describe recording means and do not describe the details of means of detecting electronic watermark information at the time of reproducing. Electronic watermark information recorded by a VCR or optical disk unit has its reproduced signal level varied depending on the reproduction characteristics of these apparatus. The reproduced signal waveform of the electronic watermark information varies also depending on the frequency characteristics of these apparatus.

SUMMARY OF THE INVENTION

An object of the present invention is to provide a method and apparatus for recording and reproducing electronic watermark information and a recording medium which enable easy detection of the watermark information at the time of reproducing.

Another object of the present invention is to provide a method and apparatus for recording and reproducing electronic watermark information and a recording medium which enable easy reproduction of the embedded electronic watermark information even if the reproduction characteristics of the reproduction apparatus vary.

Still another object of the present invention is to provide a method and apparatus for recording and reproducing electronic watermark information and a recording medium which enable easy reproduction of the electronic watermark information even if the signal level of the watermark information varies.

Still another object of the present invention is to provide a circuit arrangement which is scarcely affected by the reproduction level and frequency characteristics of the recording apparatus in detecting electronic watermark information included in a video signal which has been recorded by the recording apparatus.

In order to achieve the above objectives, the recording medium based on this invention is designed to record a video signal, electronic watermark information which is embedded in the video signal and a reference signal which is inserted at a position different from the position of the watermark information in the video signal.

The inventive method of recording electronic watermark information includes the operational steps of embedding electronic watermark information in a video signal at a minimal disturbance against the video signal, and recording a reference signal which is inserted at a position different from the position of the watermark information in the video signal.

The inventive method of recording and reproducing electronic watermark information includes the operational steps of recording electronic watermark information which is embedded in a video signal at a minimal disturbance against the video signal and a reference signal which is inserted at a position different from the position of the watermark information, reproducing the reference signal, and modifying the watermark information based on the reference signal.

The inventive method of recording electronic watermark information includes the operational steps of calculating the visually-permissible alteration range of luminous value of the luminance signal included in a video signal, and altering the luminous value of the luminance signal at a predetermined position within the calculated alteration range.

The inventive method of recording electronic watermark information includes the operational steps of calculating the visually-permissible alteration range of luminous value of the luminance signal included in a video signal, and altering the luminous value of the luminance signal at a predetermined position in case the altered luminous value is within the calculated alteration range.

The inventive method of reproducing electronic watermark information includes the operational steps of detecting a reference signal for detecting electronic watermark information from a recording medium on which are recorded a video signal, the watermark information which is embedded in the video signal at a minimal disturbance against the video signal and the reference signal which is inserted at a position different from the position of the watermark information, and modifying the watermark information based on the reference signal.

The inventive method of reproducing electronic watermark information includes the operational steps of detecting a reference signal for reproducing electronic watermark information from a recording medium on which are recorded a video signal, the watermark information which is embedded in the video signal based on the alteration of luminous value of the luminance signal included in the video signal and the reference signal which is inserted at a position different from the position of the watermark information, and modifying the luminous value of the watermark information based on the reference signal.

The inventive method of recording and reproducing electronic watermark information includes the operational steps of recording a video signal, electronic watermark information which is embedded in the video signal at a minimal disturbance against the video signal and a reference signal which is inserted at a position different from the position of the watermark information, and detecting the watermark information based on the reference signal.

The inventive method of recording electronic watermark information includes the operational steps of recording a video signal, electronic watermark information which is embedded in the video signal at a minimal disturbance against the video signal and a reference signal which is inserted at a position different from the position of the watermark information.

The inventive method of reproducing electronic watermark information includes the operational steps of detecting electronic watermark information based on a reference signal thereby to reproduce the watermark information from a recording medium on which are recorded a video signal, the watermark information which is embedded in the video signal at a minimal disturbance against the video signal and the reference signal which is inserted at a position different from the position of the watermark information.

The inventive apparatus for recording electronic watermark information comprises a detection circuit which calculates the permissible alteration range of luminous value depending on the luminous value of the luminance signal included in a video signal, and a watermark information embedment processing circuit which embeds electronic watermark information in the video signal by altering the luminous value of the luminance signal at a predetermined position within the calculated alteration range.

The inventive apparatus for recording electronic watermark information comprises a detection circuit which calculates the permissible alteration range of luminous value depending on the luminous value of the luminance signal included in a video signal, and a watermark information embedment processing circuit which embeds electronic watermark information in the video signal by altering the luminous value of the luminance signal at a predetermined position in case the altered luminous value is within the calculated alteration range.

The inventive apparatus for reproducing electronic watermark information comprises a detection means for detecting electronic watermark information based on a reference signal thereby to reproduce the watermark information from a recording medium on which are recorded a video signal, the watermark information which is embedded at a minimal disturbance against the video signal and the reference signal which is inserted at a position different from the position of the watermark information.

In the inventive electronic watermark information reproducing apparatus, the detection means includes a detection signal generating circuit which generates a detection signal for detecting a reference signal from a sync signal, a sample-holding circuit which samples and holds the amplitude of the reference signal in response to the detection signal, a gain drift calculating circuit which calculates the gain drift based on the amplitude of the reference signal provided by the sample-holding circuit, a modification circuit which modifies the luminance signal included in the video signal based on the calculation result provided by the gain drift calculating circuit, and a watermark information detecting circuit which detects the watermark information from the modified luminance signal by using the detection signal.

In the inventive electronic watermark information reproducing apparatus, the detection means includes a detection signal generating circuit which generates a detection signal for detecting a reference signal from a sync signal, a sample-holding circuit which samples and holds the amplitude of the reference signal in response to the detection signal, a gain drift calculating circuit which calculates the gain drift based on the amplitude of the reference signal provided by the sample-holding circuit, a detection circuit which detects the watermark information from the luminance signal included in the video signal by using the detection signal, and a modification circuit which modifies the amplitude of the detected watermark information based on the gain drift calculated by the gain drift calculating circuit.

The inventive apparatus for reproducing electronic watermark information comprises a watermark information detecting circuit which detects an electronic watermark signal from a video signal, a reference signal detecting circuit which detects a reference signal, and a modification circuit which modifies the amplitude of the watermark signal in response to the drop in amplitude of the reference signal.

In the electronic watermark information reproduction apparatus, the modification circuit includes a gain drift calculating circuit which calculates the drop of gain of the reference signal.

In the electronic watermark information reproduction apparatus, the watermark information detecting circuit includes an information position generating circuit which generates a watermark information position detection signal based on the sync signal.

In the electronic watermark information reproduction apparatus, the reference signal detection circuit includes a reference signal position detecting circuit which generates a reference signal position detection signal based on a sync signal.

The inventive method and apparatus are designed to append preparatorily a reference signal used for the detection of electronic watermark information at a specific position of a video signal and reproduce the watermark information based on this reference signal at the time of reproducing. The reference signal is embedded within the period of horizontal sync signal outside the picture display period, i.e., in the back-porch or front-porch portion, or outside the picture display area. At the time of detection, the embedded electronic watermark information is reproduced based on the reference signal level.

Alternatively, the reference signal may be recorded within the period of vertical sync signal. A reference timing signal is recorded at the head of the video signal so that the recording level and recording position of the electronic watermark information are detected based on the reference signal level and reproduction timing at the time of reproducing.

These and other objects, features and advantages of the invention will be apparent from the following more particular description of preferred embodiments of the invention, as illustrated in the accompanying drawings.

DESCRIPTION OF THE PREFERRED EMBODIMENTS

The method and apparatus for recording and reproducing electronic watermark information and the recording medium based on this invention will be explained with reference to the drawings.

Figure 1:
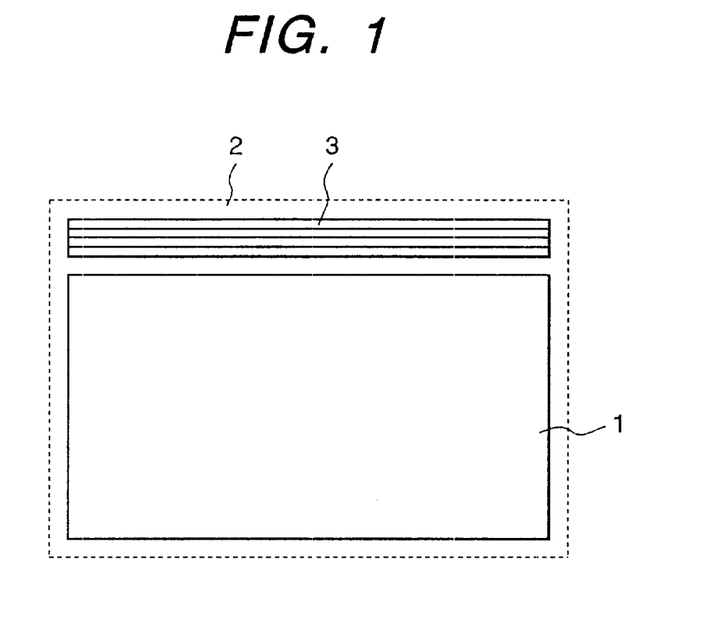
FIG. 1 is a schematic diagram showing the reference signal and the recording position thereof used by the method and apparatus for recording and reproducing electronic watermark information and the recording medium based on an embodiment of this invention.

FIG. 1 is a schematic diagram showing the reference signal and the recording position thereof used by the method and apparatus for recording and reproducing electronic watermark information based on an embodiment of this invention. In the figure, numeral 1 denotes the picture display area of a display apparatus such as a television receiver, 2 is the over-scan area which is the remaining portion of the area enclosed by the dashed lines excluding the picture display area 1, and 3 indicates the insertion position of the reference signal recorded in the over-scan area 2.

The reference signal which takes up one or more lines is inserted or added to a video signal. The video signal, with the reference signal being appended thereto, is recorded on a recording medium. The reference signal is included in the video signal so that it is located preferably in the over-scan area, instead of the picture display area 1 in which case the video signal would possibly be disturbed.

Figure 2:
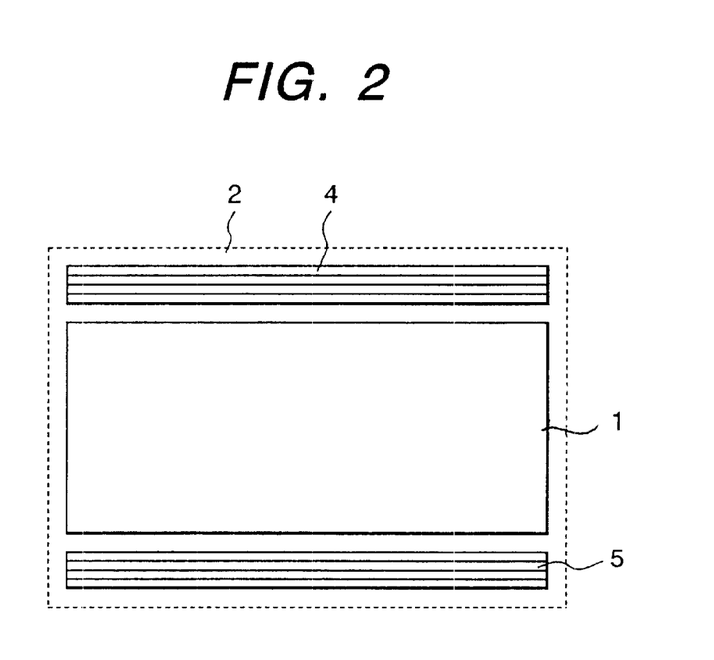
FIG. 2 is a schematic diagram showing the reference signals and the recording position thereof used by the method and apparatus for recording and reproducing electronic watermark information and the recording medium based on another embodiment of this invention.

FIG. 2 is a schematic diagram showing the reference signals and the recording position thereof used by the method and apparatus for recording and reproducing electronic watermark information and the recording medium based on another embodiment of this invention. In the figure, reference signals 4 and 5 are inserted or added to a video signal so that the signals 4 and 5 are located within the upper over-scan area and lower over-scan area, respectively, and each included in one or more lines of the video signal.

Generally, TV signals are liable to sag at the top and bottom of the screen due to the influence of the transmission system. Specifically, when a TV signal for producing a constant luminance over the entire screen is transmitted, it varies due to the influence of the transmission system, resulting in a varied displayed luminance at the top and bottom of the screen. This phenomenon is pronounced particularly in gray colors.

This phenomenon can possibly cause the luminance of electronic watermark information to vary in an asymmetric fashion. The embodiment of FIG. 2 is intended to correct the luminance variation by inserting the reference signals 4 and 5 at the top and bottom of the over-scan area. In this arrangement, the detection level or luminous value of the electronic watermark information is corrected by use of the reference signal 4 for the top of the screen and the reference signal 5 for the bottom of the screen. Alternatively, the mean value of the upper and lower reference signals 4 and 5 may be used for the correction. Consequently, even if the luminance variation arises due to the sag, the detection level of electronic watermark information can be corrected.

Figure 3:
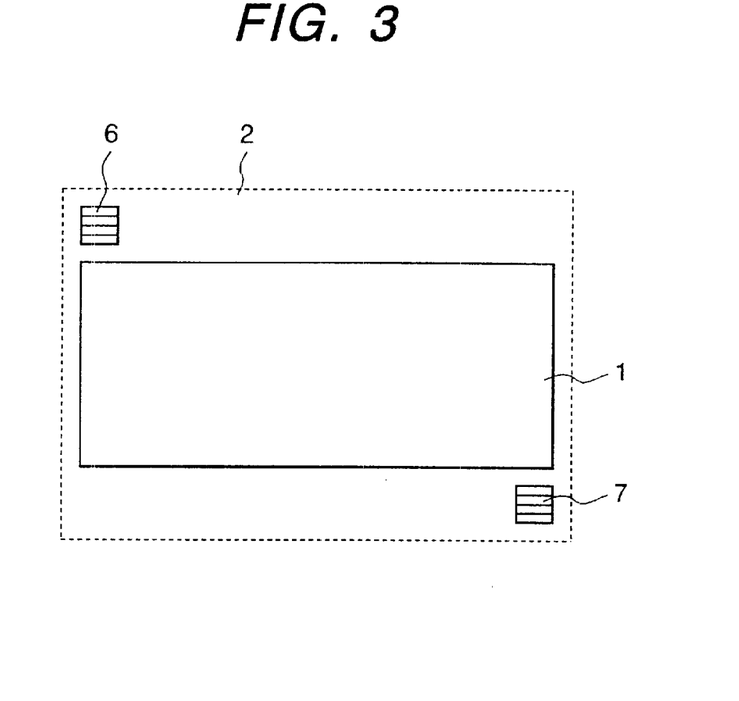
FIG. 3 is a schematic diagram showing the reference signals and the recording position thereof used by the method and apparatus for recording and reproducing electronic watermark information and the recording medium based on still another embodiment of this invention.

FIG. 3 is a schematic diagram showing the reference signals and the recording position thereof used by the method and apparatus for recording and reproducing electronic watermark information and the recording medium based on still another embodiment of this invention.

In this embodiment, reference signals 6 and 7 are inserted to take up part of the top of and part of the bottom of the over-scan area 2. The reference signals 6 and 7 are recorded to locate at the corners of the screen, instead of the entire lines, in which case the signals 6 and 7 would distribute the video signal in its picture display period. Alternatively, a reference signal may be recorded to locate only at the top or bottom of the over-scan area 2, instead of inserting the reference signals 6 and 7 to locate in part of the top of and part of the bottom of the over-scan area 2. In the case of a VCR, the head is switched at the lower side of the tape, allowing of less space for the reference signal 7, and therefore it is advantageous to adopt the reference signal 6 in the larger area of the upper side of the tape.

The reference signals 6 and 7 added to the video signal have the peak white level in terms of the luminance signal. Accordingly, in case the video signal has its luminance varied in order to embed electronic watermark information, the correct watermark information can be obtained by modifying the luminance of the video signal by use of the reference signals 6 and 7. Namely, the electronic watermark information is embedded in the video signal in terms of the varied luminance of the video signal, as will be explained in detail later, and the luminance level varied by the transmission system can be corrected by use of the reference signals 6 and 7, whereby the watermark information can be detected easily.

Figure 4:
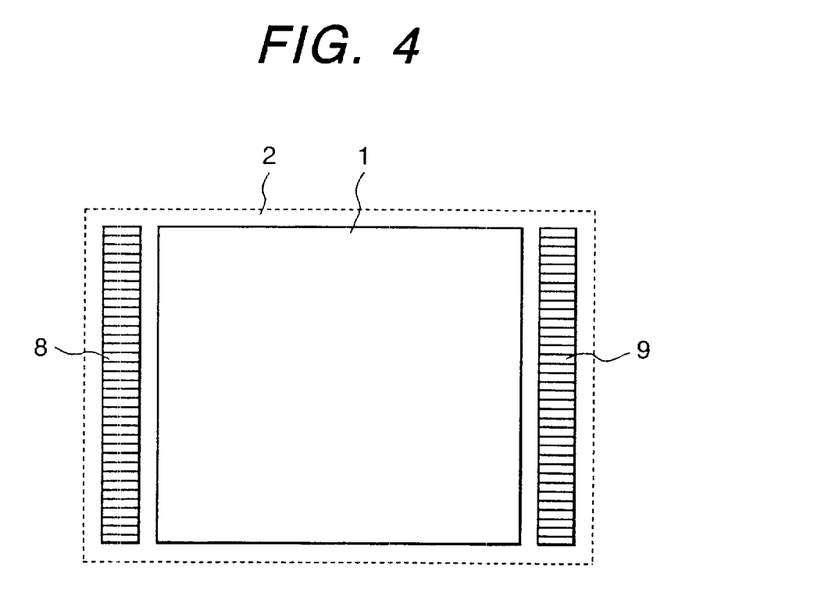
FIG. 4 is a schematic diagram showing the reference signals and the recording position thereof used by the method and apparatus for recording and reproducing electronic watermark information and the recording medium based on still another embodiment of this invention.

FIG. 4 is a schematic diagram showing the reference signals and the recording position thereof used by the method and apparatus for recording and reproducing electronic watermark information and the recording medium based on still another embodiment of this invention.

Shown in FIG. 4 is an example in which reference signals 8 and 9 are inserted in the over-scan area 2 immediately before and after the horizontal sync signals. Namely, the reference signals 8 and 9 are added to the video signal by being recorded at the beginning and end of the horizontal sync period. Alternatively, a reference signal may be inserted only at the head or end of the horizontal sync signal for correcting the luminance level of the video signal, instead of adding the reference signals 8 and 9 at the beginning and end of the horizontal sync period.

Figure 5:
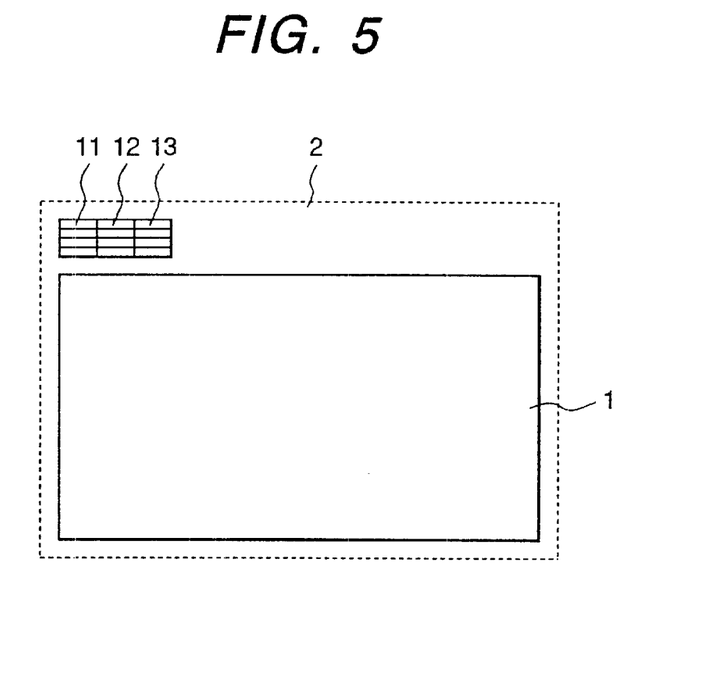
FIG. 5 is a schematic diagram showing the reference signals and the recording position thereof used by the method and apparatus for recording and reproducing electronic watermark information and the recording medium based on still another embodiment of this invention.
Figures 6A, 6B:
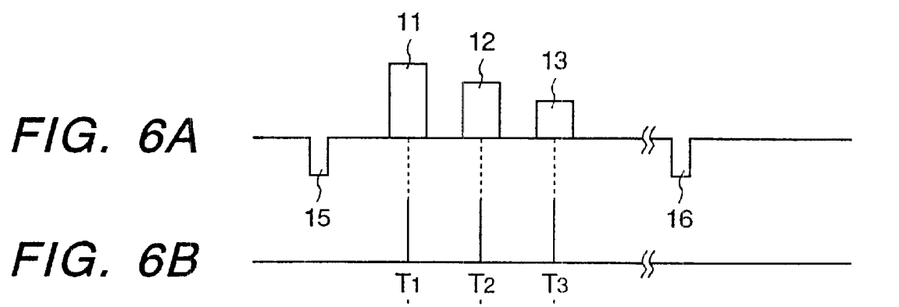
FIGS. 6A, 6B and 6C are waveform diagrams showing the first, second and third reference signals shown in FIG. 5, the timing signal, and the sampled-and-held reference signals based on an embodiment of this invention.
Figure 6C:
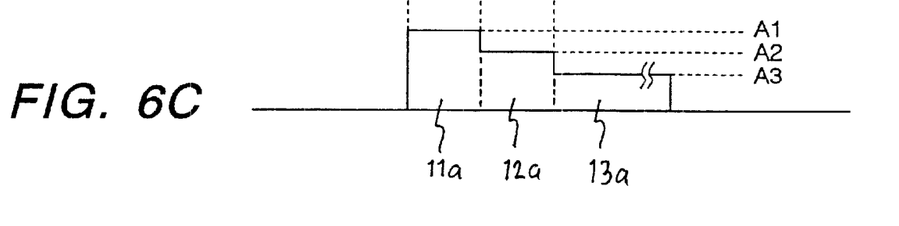

FIG. 5 is a schematic diagram showing the reference signals and the recording position thereof used by the method and apparatus for recording and reproducing electronic watermark information and the recording medium based on still another embodiment of this invention. In this embodiment, a first, second and third reference signals 11,12 and 13 having different luminance levels are inserted to locate in the over-scan area 2. Each of the reference signals 11,12 and 13 may be a line, instead of a block shown in FIG. 5. FIGS. 6A,6B and 6C are waveform diagrams of the first, second and third reference signals shown in FIG. 5, the timing signal, and the sampled-and-held reference signals based on an embodiment of this invention. FIG. 6A shows the waveform of the first, second and third reference signals 11,12 and 13, which are inserted between the horizontal sync signals 15 and 16 in the over-scan area 2.

These reference signals 11,12 and 13 have different levels. For example, the first reference signal 11 has a level equal to the peak white level (IRE 100), the second reference signal 12 has a level equal to half the peak white level (IRE 50), and the third reference signal 13 has the level of IRE-10.

FIG. 6B shows the waveform of the timing pulse, which provides timing signals T1, T2 and T3 for sampling the first, second and third reference signals 11,12 and 13, respectively. The timing signals T1, T2 and T3 are generated at predetermined time points by being timed to the horizontal sync signal 15. The first, second and third reference signals 11,12 and 13 are sampled and held in response to the timing signals T1, T2 and T3, respectively.

The timing signals T1, T2 and T3 may be added at the head of the video signal, in which case the signals can be used as timing signals for the detection of electronic watermark information and can also be used as a signal for modifying the timing signals which are produced from the sync signal.

FIG. 6C shows the waveforms of the first, second and third sampled-and-held reference signals 11*a*,12*a* and 13*a* having levels A1, A2 and A3, respectively. Using these reference signals 11*a*,12*a* and 13*a* having the different levels enables the discrimination as to whether the variation of luminance level of the reference signals 11*a*,12*a* and 13*a* is the linear type or nonlinear type. In case the luminance varies at a constant rate irrespective of the luminance level, i.e., linear variation, it is possible to correct the luminance of the video signal at the position where electronic watermark information is embedded by using one of the first, second and third reference signals 11*a*,12*a* and 13*a*. In another case of a different variation rate of luminance level depending on the reference signal, i.e., nonlinear variation of luminance level, a luminance variation rate for the luminance level is evaluated approximately from the levels of the first, second and third reference signals 11*a*,12*a* and 13*a* and the luminance of electronic watermark information is corrected depending on the luminance level of the electronic watermark information to be detected. In this manner, the luminance of electronic watermark information can be corrected accurately.

By making the inserting positions of the first, second and third reference signals 11,12 and 13 synchronous with the position where electronic watermark information is recorded, a reference clock is produced based on the timing signals T1, T2 and T3, and the recording position of the watermark information can be detected based on the clock.

Electronic watermark information is embedded in a block of 8-by-8 pixels at a predetermined position, as described in the prior art publications. For extracting the electronic watermark information at the time of reproducing, it is crucial to make accurate synchronization with the block. By making the timing signals T1, T2 and T3 synchronous with the position of embedment of electronic watermark information and recording the timing signals in synchronism with the 8-by-8 pixel block at recording, it becomes possible to minimize the influence of the phase variation of the timing signals in the transmission system.

The first, second and third reference level signals 11,12 and 13 which have been extract together with the watermark information are latched by the sample-holding circuit, and used to detect the watermark information embedded in the video signal, so that the influence of the luminance variation by the transmission system can be corrected.

Figure 7:
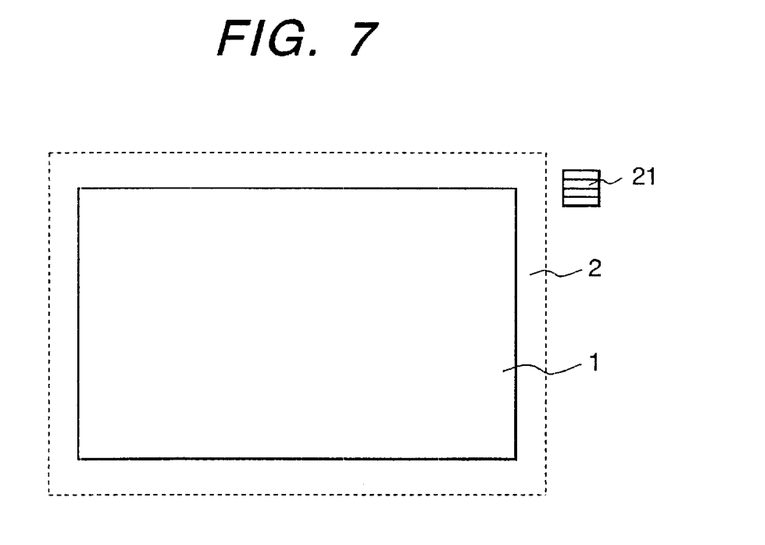
FIG. 7 is a schematic diagram showing the reference signal and the recording position thereof used by the method and apparatus for recording and reproducing electronic watermark information and the recording medium based on still another embodiment of this invention.

FIG. 7 is a schematic diagram showing the reference signal and the recording position thereof used by the method and apparatus for recording and reproducing electronic watermark information and the recording medium based on still another embodiment of this invention. In the figure, a reference signal 21 is inserted in the horizontal blanking period outside the over-scan area 2, and it is considered to be located at the top-right position seen from the screen as shown.

Figure 8:
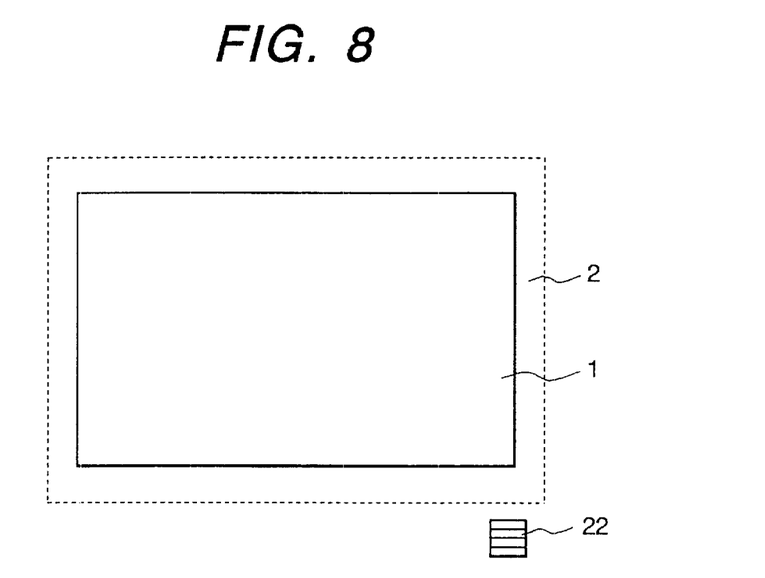
FIG. 8 is a schematic diagram showing the reference signal and the recording position thereof used by the method and apparatus for recording and reproducing electronic watermark information and the recording medium based on still another embodiment of this invention.

FIG. 8 is a schematic diagram showing the reference signal and the recording position thereof used by the method and apparatus for recording and reproducing electronic watermark information and the recording medium based on still another embodiment of this invention. In the figure, a reference signal 22 is inserted in the vertical blanking period outside of the over-scan area 2, and it is considered to be located at the bottom-right position seen from the screen as shown.

Figure 9:
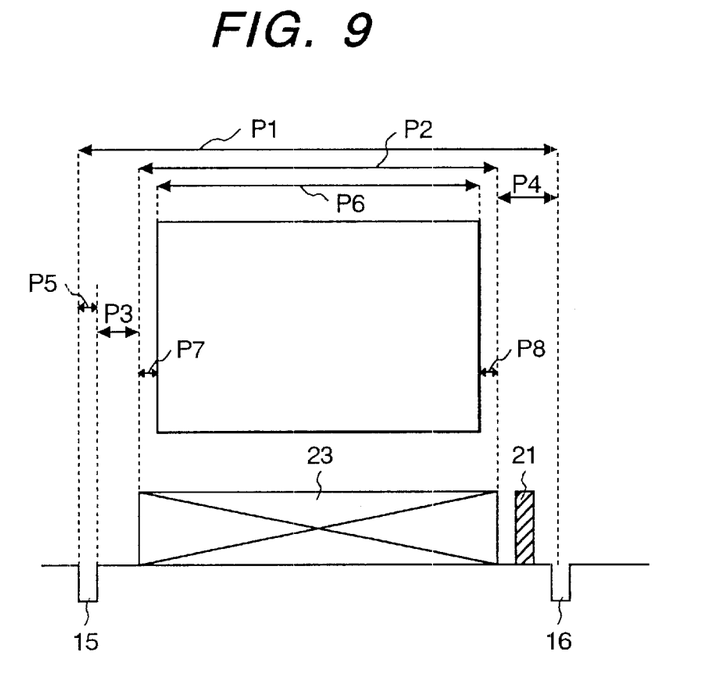
FIG. 9 is a schematic diagram showing the positional relation among the reference signal shown in FIG. 7, the horizontal sync period, the picture display area and the over-scan area.
Figure 10:
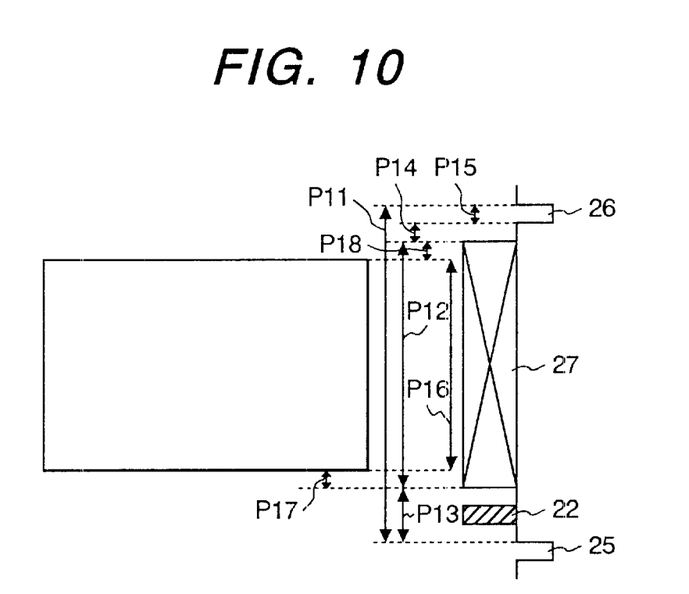
FIG. 10 is a schematic diagram showing the positional relation among the reference signal shown in FIG. 8, the horizontal sync period, the picture display area and the over-scan area.

FIG. 9 is a schematic diagram showing the positional relation among the reference signal shown in FIG. 7, the horizontal sync period, the picture display area and the over-scan area. FIG. 10 is a schematic diagram showing the positional relation among the reference signal shown in FIG. 8, the horizontal sync period, the picture display area and the over-scan area.

As shown in FIG. 9, a horizontal sync period P1 is divided into a video signal period P2, horizontal flyback periods P3 and P4, and a sync signal period P5. The video signal period P2 is further divided into a picture display period P6 and over-scan periods P7 and P8. The video signal period P2 is usually set wider than the screen width P6 so that it completely covers the screen width.

In this embodiment, the reference signal 21 is recorded to locate outside of the picture display period P6. Indicated by 15 and 16 in FIG. 9 are horizontal sync signals, and 23 is a video signal.

The reference signal 21 may be located before the video signal 23 without any problem, instead of being located after the video signal 23 shown in the figure.

FIG. 10 is a schematic diagram showing the positional relation among the reference signal shown in FIG. 8, the vertical sync period, the picture display area and the over-scan area. As shown in FIG. 10, a vertical sync period P11 is divided into a video signal period P12, vertical flyback periods P13 and P14, and vertical sync signal period 15. The video signal period P12 is further divided into a picture display period P16 and over-scan periods P17 and P18. The video signal period P12 is usually set greater than the screen height P16 so that it completely covers the screen height.

In this embodiment, the reference signal 22 is recorded to locate outside of the video signal period P12. Indicated by 25 and 26 in FIG. 10 are vertical sync signals, and 27 is a video signal between the vertical sync signals 25 and 26.

Next, the arrangement for reproduction based on the processing of information recorded on the recording medium, with electronic watermark information being embedded in it, will be explained with reference to FIGS. 11A and 11B, FIG. 12 and FIG. 13.

Figure 11A:
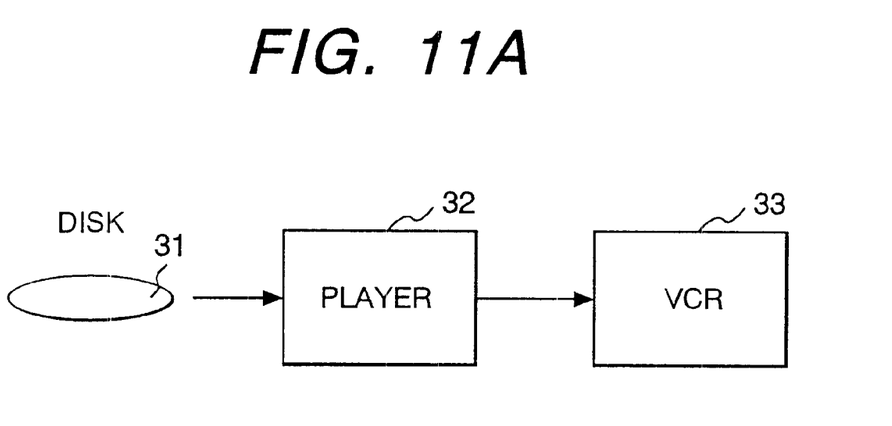
FIGS. 11A and 11B are block diagrams of the electronic watermark information reproduction apparatus based on an embodiment of this invention.

FIGS. 11A and 11B are block diagrams showing the recording/reproduction apparatus based on an embodiment of this invention. In FIG. 11A, a recording medium, e.g., a disk 31, has a record of a video signal, electronic watermark information embedded in the video signal and a reference signal for correcting the amplitude variation at the reproduction of the watermark information. The disk 31 is driven for reproducing by the video player 32. Unless copying is inhibited by the electronic watermark information, the video signal recorded on the disk 31 can be transferred for recording to the VCR 33.

Figure 11B:
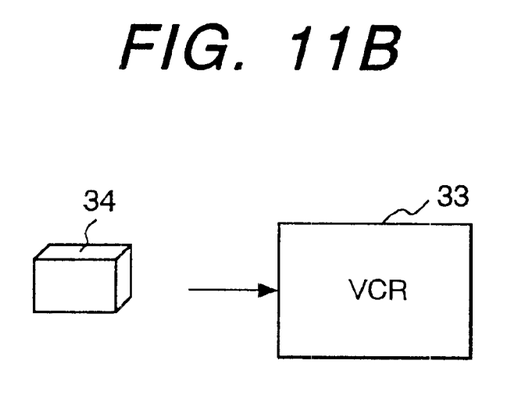

FIG. 11B shows the reproducing of the tape 34 by using the VCR 33. The VCR 33 reproduces the record on the tape 34 only when the tape 34 is a legal duplication.

Electronic watermark information is used conceivably in two ways. One is to verify as to whether or not a disk is a legal duplication, and the other is to verify as to whether or not a tape has a legal copy of record produced by a VCR.

When a disk, with electronic watermark information being recorded, is driven for reproducing by a proper player, the player first reads the watermark information to verify the legality of the disk and proceeds to the reproducing operation, as will be explained in the following.

Figure 12:
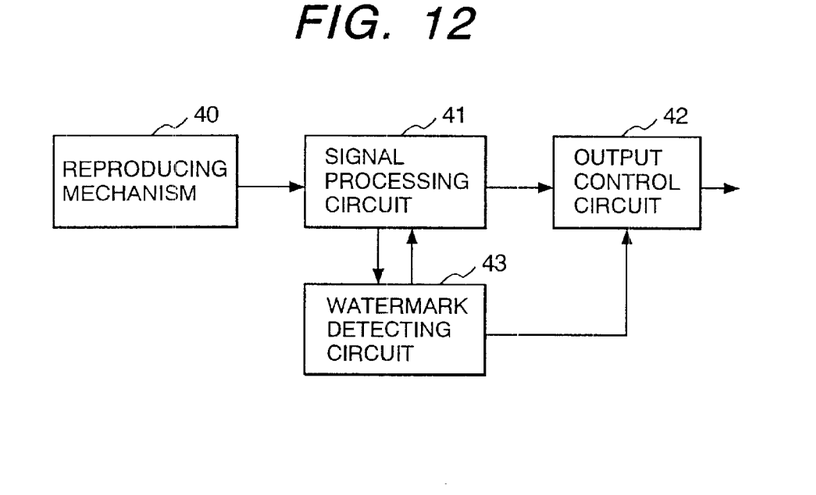
FIG. 12 is a block diagram of the electronic watermark information reproduction apparatus based on an embodiment of this invention.

FIG. 12 is a block diagram of the reproduction apparatus based on an embodiment of this invention. The apparatus includes a disk reproducing mechanism 40, a signal processing circuit 41 which processes the reproduced signal, an output control circuit 42 which controls the transfer of the reproduction output to the player output terminal, and an electronic watermark information detecting circuit 43.

Information recorded on the disk is reproduced by the reproducing mechanism 40 and fed to the signal processing circuit 41. If electronic watermark information based on CGMS (Copy Generation Management System) or SCMS (Serial Copy Management System) for example is recorded on the disk, it is read out and fed to the electronic watermark information detecting circuit 43. The detecting circuit 43 decodes the watermark information and gives the decoded result to the output control circuit 42.

The output control circuit 42 controls the delivery of the reproduction output in accordance with the watermark information. In case the detecting circuit 43 has detected the copy inhibition in the watermark information, the output control circuit 42 blocks the reproduction output. Alternatively, the detecting circuit 43 gives its copy inhibition output to the signal processing circuit 41 thereby to halt the operation of the circuit 41.

The electronic watermark information based on CGMS is 2-bit information, and it is designed to indicate copy-enabled, one-copy-enabled, or copy-inhibited. The electronic watermark information based on SCMS is designed to indicate copy-enabled or copy-inhibited.

The electronic watermark information detecting circuit 43 is involved in such a problem that the video signal or information is distorted to have its amplitude varied during the passage through the transmission system and the watermark information embedded in the video signal or information is also varied in its amplitude and cannot be read out at the time of reproducing.

In order to overcome this problem, the inventive method and apparatus are designed to insert a reference signal to the video signal (or information), as has been explained in connection with FIG. 1 through FIG. 10. Based on this reference signal, the amplitude of the video signal in which the watermark information is embedded is corrected thereby to improve the accuracy of detection based on the arrangement shown in FIG. 12.

Figure 13:
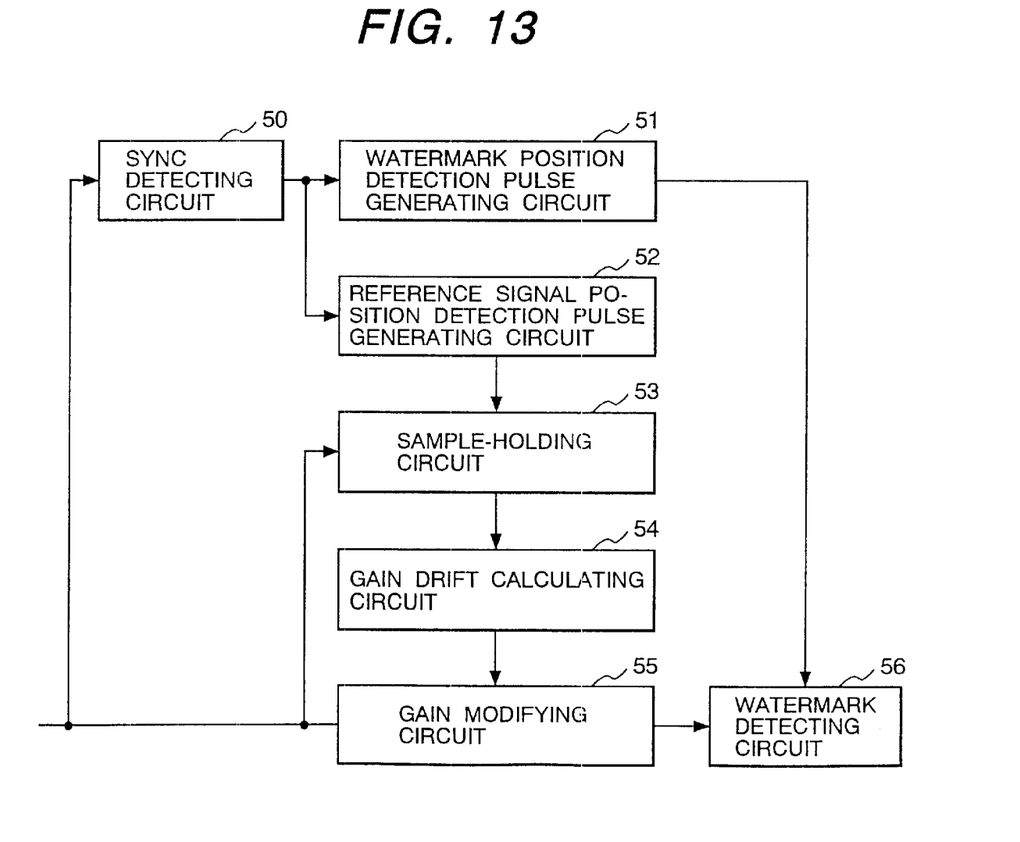
FIG. 13 is a block diagram showing an embodiment of the reference signal detecting circuit in the electronic watermark information reproduction apparatus of this invention.

The following explains with reference to FIG. 13 as an example the improvement of detection accuracy of the detecting circuit based on the manipulation of the detecting circuit in response to a reference signal which is embedded in a predetermined position of the video signal.

FIG. 13 is a block diagram showing an embodiment of the reference signal detecting circuit included in the inventive reproduction apparatus. In the figure, the video signal reproduced from the recording medium is supplied to the sync detection circuit 50, by which the horizontal sync signal or vertical sync signal is detected. In response to the sync signal detected by the sync detection circuit 50, the watermark position detection pulse generating circuit 51 generates a pulse which is used to detect the position of watermark information. The sync signal is also used by the reference signal position detection pulse generating circuit 52 to generate a pulse which is used to detect the position of a reference signal which is recorded by being inserted in the video signal (refer to FIG. 1 through FIG. 10 and the related explanation).

The position detection pulse generated by the reference signal position detection pulse generating circuit 52 is supplied to the sample-holding circuit 53 which samples and holds the reference signal level. The sample-holding circuit 53 is further supplied with the video signal, and it samples and holds the amplitude of the reference signal inserted in the video signal in response to the position detection pulse. The sampled amplitude of the reference signal is supplied to the gain drift calculating circuit 54.

The gain drift calculating circuit 54 is designed to calculate the variation of reference signal amplitude, i.e., the variation of the gain of the luminance signal, caused by the transmission system, from the predetermined amplitude of the recorded reference signal. The gain drift of luminance signal calculated by the gain drift calculating circuit 54 is indicated to the gain modifying circuit 55.

The gain modifying circuit 55, which is supplied with the video signal, modifies the gain of the luminance signal of the video signal. The video signal, with its luminance gain being modified, is supplied to the information detecting circuit 56, by which the electronic watermark information is detected in response to the pulse supplied from the watermark position detection pulse generating circuit 51.

In this embodiment, the gain variation of luminance signal caused by the timing signal is calculated from the level (amplitude) of the reference signal included in the reproduced signal, and the gain of luminance signal of the video signal is modified based on the calculation result for the detection of the electronic watermark information. By correcting the level variation of the luminance signal caused by the transmission system by using the reference signal which is also distorted, it becomes possible to reproduce the watermark information by eliminating or reducing the influence of the level variation of the luminance signal caused by the transmission system.

Figure 14:
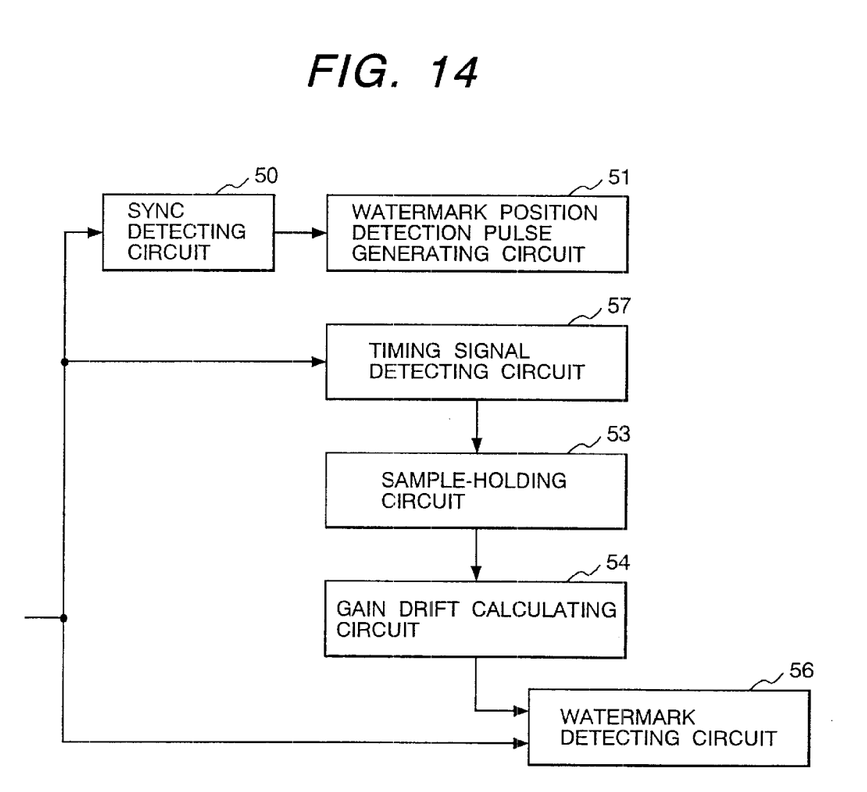
FIG. 14 is a block diagram showing another embodiment of the reference signal detecting circuit in the electronic watermark information reproduction apparatus of this invention.

FIG. 14 is a block diagram showing another embodiment of the reference signal detecting circuit included in the inventive reproduction apparatus. As shown in this figure, the output of the gain drift calculating circuit 54 and the video signal may be supplied directly to the watermark information detecting circuit 56 so that the watermark information is detected and the luminance gain of the detected information is modified based on the calculation result of the gain drift calculating circuit 54, instead of modifying the gain of luminance signal by the gain modifying circuit 55 in the embodiment shown in FIG. 13.

In place of the circuit for detecting the position of reference signal from the sync signal, a timing signal detecting circuit 57 may be provided to detect the timing signals T1, T2 and T3 of FIG. 6 so that the sample-holding circuit 53 samples and holds the amplitude of reference signal by using these timing signals.

Instead of dealing with the reference signal level as explained above, the reference signal may be recorded by being inserted at a predetermined position, as shown in FIG. 6, relative to the sync signal so that the timing of reproduction of electronic watermark information can be modified and the watermark information can be detected more easily.

Figure 15:
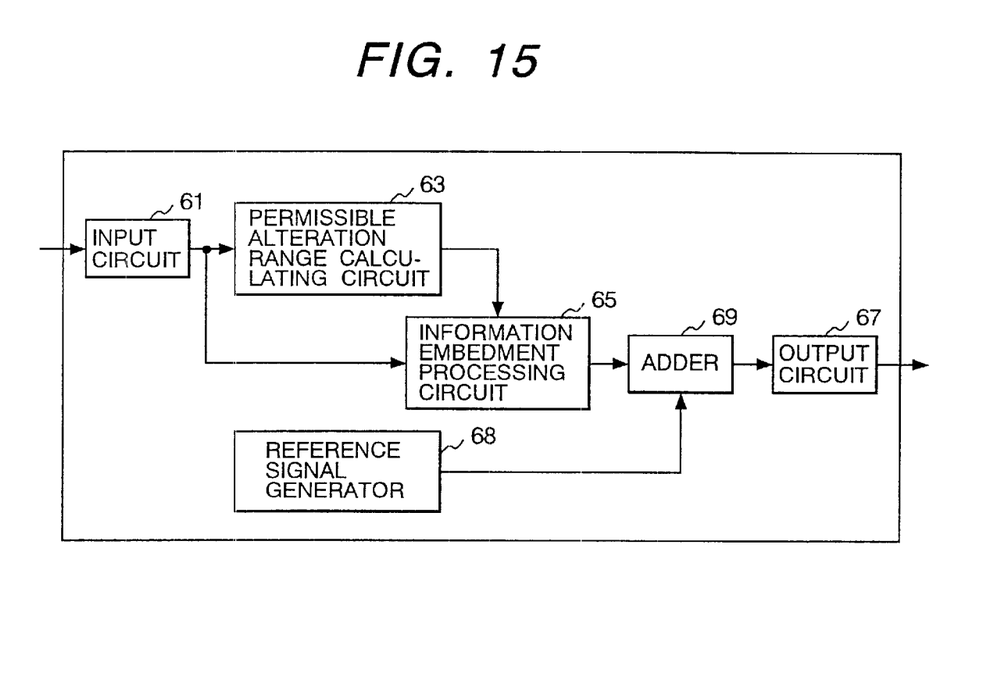
FIG. 15 is a block diagram of the electronic watermark information recording apparatus based on an embodiment of this invention.

FIG. 15 is a block diagram of the electronic watermark information recording apparatus based on an embodiment of this invention. This embodiment is designed to embed electronic watermark information by varying the luminance of pixels.

In FIG. 15, a video signal is fed to the input circuit 61, which extracts the luminance signal from the video signal. The luminance signal is supplied to the permissible alteration range calculating circuit 63, which calculates depending on the luminance signal the alteration range of luminance signal which does not impose a significant visual drawback. Specifically, the calculating circuit 63 calculates the alteration range in consideration of the fact that the visual luminance does not much vary even for a large variation of luminance signal in picture portions having a large luminance variation, while the luminance variation is much visually noticeable in response to the variation of luminance signal in picture portions having a small luminance variation.

The permissible alteration range calculating circuit 63 can be accomplished by means of a CPU of a computer. The calculation result of the circuit 63 is given to the information embedment-processing circuit 65, which implements the process of embedding the electronic watermark information in the video signal by altering the luminance of the video signal when the luminance level is within the permissible alteration range. The video signal, with the electronic watermark information being embedded therein based on the alteration of luminance signal, is held in the memory of the output circuit 67 until the end of process for one frame of picture, and thereafter it is released from the memory.

The calculation process by the permissible alteration range calculating circuit 63 is implemented based on the following.

(1) At a picture portion where the variation of edge is great, the picture does not much vary visually even for a large variation of amplitude of the edge signal, whereas at a picture portion where the edge variation is small, the picture visually varies significantly when the amplitude of edge signal is altered greatly.

(2) The alteration range of picture is limited to the range in which the picture does not vary visually, or to the range in which the visual variation of picture does not cause the discomfort of viewers.

Based on the embedment of electronic watermark information in this manner in terms of luminance different from the original picture, the resulting picture does not vary in a visual sense. The permissible alteration range calculating circuit 63 memorizes the luminance before and after the image processing for each pixel, verifies as to whether or not the altered luminance is within the permissible alteration range, and alters the luminance signal only if it is within the permissible alteration range.

The information embedment processing circuit 65 initially selects pixels to be rendered the luminance alteration among all pixels of the picture. Subsequently, the circuit 65 embeds the information by altering the luminance to specific values for the selected pixels having the luminance within the permissible alteration range. As a result, a video signal, with the electronic watermark information being embedded therein, is produced, and it is released to the outside by way of the output circuit 67.

The circuit arrangement of FIG. 15 further includes a reference signal generating circuit 68. The reference signal generated by the circuit 68 is supplied to the adder 69, by which the signal is added to the video signal in which the electronic watermark information provided by the information embedment processing circuit 65 is embedded, and the resulting signal is recorded by way of the output circuit 67 onto the recording medium (not shown).

Next, the alteration of luminance by the information embedment processing circuit 65 will be explained with reference to FIG. 16.

Figure 16:
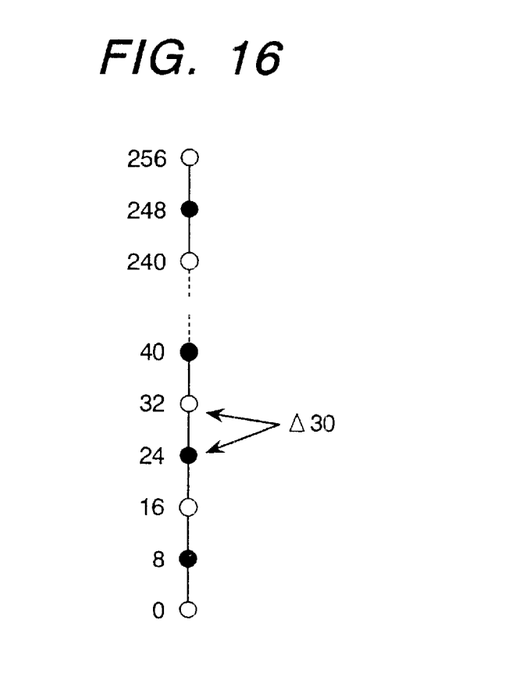
FIG. 16 is a schematic diagram showing the linear display of luminous values of pixels.

FIG. 16 is a schematic diagram showing along a line the luminous values of pixels. The luminous value of a pixel is assumed to range from 0 to 255. In the figure, a plain circle on the line represents embedded information "0" of a luminous value which is a multiple of 16, while a filled circle represents embedded information "1" of a luminous value which is a multiple of 16 added by 8.

The basic operation of the information embedment processing circuit 65 will be explained first. For obtaining the electronic watermark information, it is necessary to alter the luminance of a pixel of the picture to the closest plain circle or filled circle. Specifically, information of "0" to be embedded in a pixel is altered to a plain circle, while information of "1" is altered to a filled circle. For example, for luminous value 30 of a pixel indicated by A in the figure, the pixel has its luminous value altered to 32 in case the information to be embedded is "0" or altered to 24 in case the information is "1".

Next, the usage of the permissible alteration range calculating circuit 63 will be explained. In embedding the electronic watermark information, the picture occasionally varies visually due to excessive alteration of the luminance of pixels. For preventing this impropriety, it is necessary to alter the pixel value within the permissible alteration range. For example, in case a pixel Δ has luminous value 30 and has a permissible luminance alteration range of 26–33 as shown in FIG. 16, the pixel can have its luminance varied to 32 in accordance with the foregoing basic operation when the information to be embedded is "0". Whereas, in case the information to be embedded is "1", the target luminance 24 is outside the permissible alteration range and therefore the luminance value is altered to 26 that is closest to 24, or alternatively this pixel is left unchanged and other predetermined pixel is treated for luminance alteration.

The manner of extracting the electronic watermark information from the video signal will be explained. Initially, the pixels having varied luminous values are selected based on their predetermined positions by use of pulses derived from the horizontal sync signal. Namely, these pixels having varied luminous values are selected based on the same rule as for the pixel selection by the information embedment processing circuit 65.

Subsequently, the luminance signal of each selected pixel is taken out to determine as to whether the embedded information is "0" or "1" depending on whether the luminous value is closer to a multiple of 16 or a multiple of 16 added by 8.

Because of luminance alteration within the permissible alteration range, the information embedment processing circuit 65 will not occasionally be able to alter the luminance exactly to a multiple of 16 or a multiple of 16 added by 8. Therefore, there will arise errors at a certain probability in information extraction. This problem, however, can be overcome by embedding the same information in multiple pixels and extracting the information based on the majority decision.

In detecting the recorded electronic watermark information, it is crucial to modify the level variation of luminance signal. On this account, the inventive method and apparatus implements this modification by using a reference signal which is recorded in advance in the video signal, as shown in FIG. 17.

Figure 17:
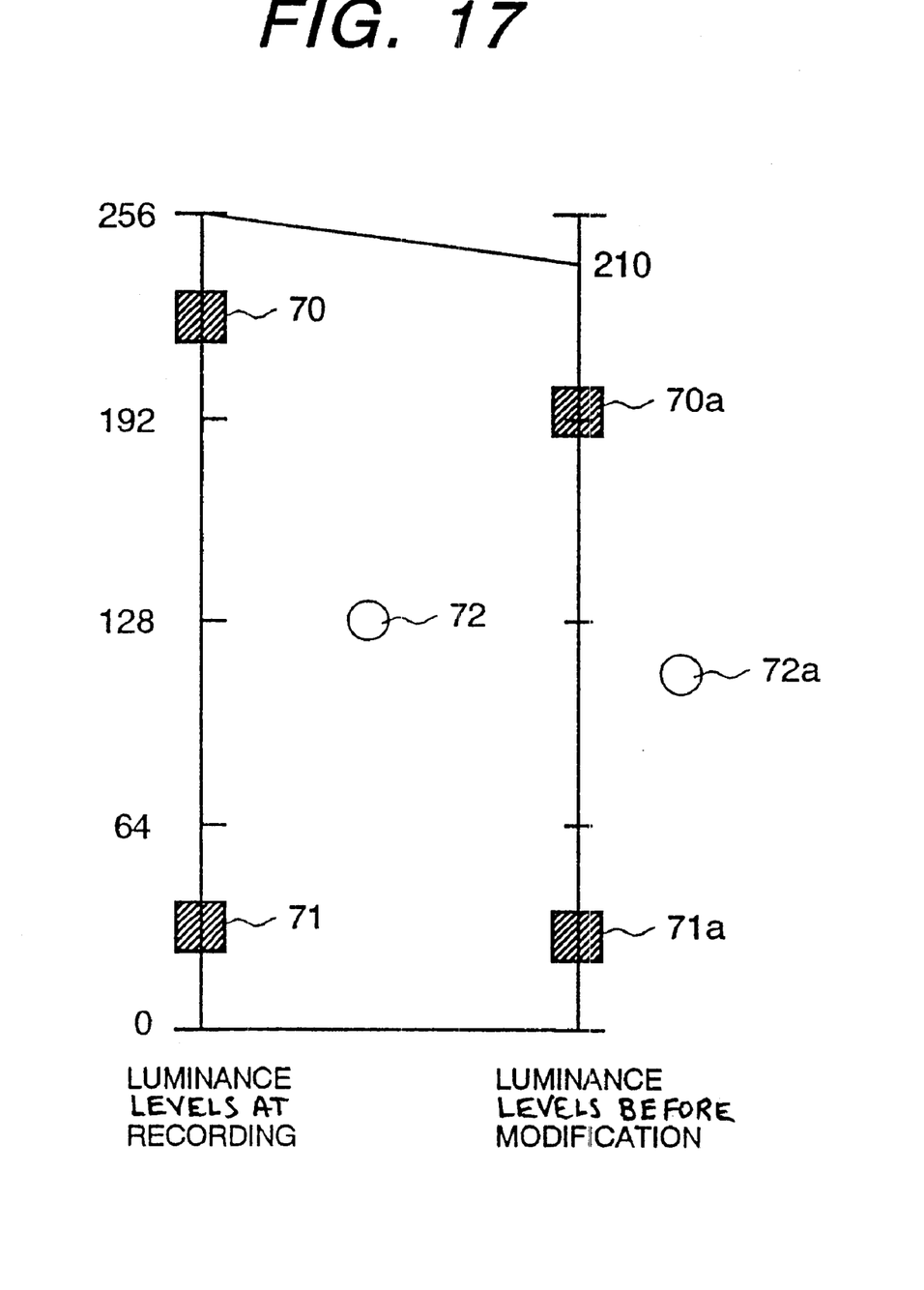
FIG. 17 is a schematic diagram showing the modification of luminance based on this invention.

FIG. 17 is a schematic diagram showing the affair of luminance modification based on this invention. Indicated by 70 and 71 in the figure are positions of luminous values of the reference signal recorded in the video signal. These positions are of the first and second luminous values of the reference signal explained in connection with FIG. 6. Another position 72 is of luminous value 128 of the electronic watermark information resulting from the alteration of luminous value of the predetermined pixel.

When the amplitude of the luminance signal included in the video signal decreases, the luminous level of the electronic watermark information embedded in the luminance signal also falls as shown in FIG. 17, and the luminous value moves to position 72a. Similarly, the luminous values of the reference signal have their positions 70 and 71 moving to positions 70a and 71a. Based on the known luminous value 256 and the luminous value of reference signal, the luminous value of the position 72a can be altered to take the position 72.

Detection of electronic watermark information on the part of reproduction at the same level as the part of recording will occasionally fail due to the level variation. Whereas, the inventive method and apparatus are capable of correcting the luminance level on the part of reproduction based on the reference signal recorded in the video signal, whereby the electronic watermark information can be detected efficiently.

According to the present invention, even if the electronic watermark information recorded in the video signal is distorted by the transmission system, the luminance level of the watermark information can be corrected based on the reference signal recorded at a different position, and consequently the electronic watermark information can be detected more accurately.

The invention may be embodied in other specific forms without departing from the spirit or essential characteristics thereof. The present embodiment is therefore to be considered in all aspects as illustrative and not restrictive, the scope of the invention being indicated by the appended claims rather than by the foregoing description and all changes which come within the meaning and range of equivalency of the claims are therefore intended to be embraced therein.

What is claimed is:

1. A method of reproducing electronic watermark information comprising the steps of:

detecting a reference signal for detecting electronic watermark information from a recording medium having recorded thereon a video signal, the electronic watermark information being embedded in the video signal by alteration of a luminous value of a luminance signal included in the video signal, and the reference signal being inserted in the video signal at a position different from a position of embedment of the electronic watermark information; and modifying a luminous value of the electronic watermark information based on the reference signal;.

wherein the modifying step includes the step of calculating a drop of a gain of the reference signal; and wherein the detecting step includes the steps of
generating an electronic watermark information position detection signal based on a sync signal, and
generating a reference signal position detection signal based on a sync signal.

2. An apparatus for reproducing electronic watermark information comprising:

an electronic watermark information detecting circuit which detects electronic watermark information from a video signal;

a reference signal detecting circuit which detects a reference signal; and a modification circuit which modifies an amplitude of the electronic watermark information based on an amplitude of the reference signal;

wherein the modification circuit includes a gain drift calculating circuit which calculates a drop of a gain of the reference signal;

wherein the electronic watermark information detecting circuit includes an electronic watermark position generating circuit which generates an electronic watermark information position detection signal based on a sync signal; and wherein the reference signal detecting circuit includes a reference signal position generating circuit which generates a reference signal position detection signal based on a sync signal.

* * * * *